United States Patent [19]

DeLeeuw

[11] Patent Number: 5,881,285

[45] Date of Patent: Mar. 9, 1999

[54] ASSOCIATING A PHYSICAL DRIVER OBJECT WITH ITS LOGICAL CONTENTS

[75] Inventor: William C. DeLeeuw, Hillsboro, Oreg.

[73] Assignee: Intel Corporation, Santa Clara, Calif.

[21] Appl. No.: 646,072

[22] Filed: May 7, 1996

[51] Int. Cl.$^6$ .................................................. G06F 13/10
[52] U.S. Cl. ........................................................ 395/681
[58] Field of Search ............................................ 395/681

[56] References Cited

U.S. PATENT DOCUMENTS

| 5,412,798 | 5/1995 | Garney | 395/651 |
| 5,519,831 | 5/1996 | Holzhammer | 395/182.2 |
| 5,774,640 | 6/1998 | Kurio | 395/182.02 |

OTHER PUBLICATIONS

Asche, Ruediger R., "The Little Device Driver Writer", Microsoft Developer CD–ROM, pp. (26) Feb. 1994.
(no author given), "Windows 95 Graphics Device Interface", Microsoft Developer CD–ROM, pp. (4) 1996.
Itoh et al., "Concurrent Object–Oriented Device Driver Programming in Apertos Operating System", Keio University Dept. of Computer Science, Japan, pp. (8) Aug. 1994.

*Primary Examiner*—Alvin E. Oberley
*Assistant Examiner*—St. John Courtenay, III
*Attorney, Agent, or Firm*—William H. Murray

[57] ABSTRACT

Association of a physical driver object with its logical contents in a logical driver object by identifying the logical driver object and using a non-operating system component to cause recreation of the physical driver object. A handle and a memory address of a logical driver object are obtained and the handle is locked to prevent its movement in memory. A clone of the logical driver object is created, whereupon the contents of the logical driver object and the contents of the clone are swapped. The clone is then deleted. Subsequent reselection of the logical driver object into a device context results in an observable recreation of a corresponding physical driver object.

28 Claims, 3 Drawing Sheets

ASSOCIATING A PHYSICAL DRIVER OBJECT WITH ITS LOGICAL CONTENTS

BACKGROUND OF THE INVENTION

1. Field of the Invention

This invention relates generally to the field of computer memory mapping and more particularly to mapping logical and physical driver objects corresponding to device drivers.

2. Description of the Related Art

An application running on a conventional computer system having a processor and an operating system communicates with an operating system module ("graphics module") to request that graphics be displayed on a monitor or printed by a printer coupled to the computer system. In certain operating systems, such as a "MICROSOFT" "WINDOWS" operating system, such a module is called a Graphics Device Interface (GDI). In order to execute the graphics command from the application, the graphics module communicates with a display driver or printer driver ("device driver"). Device drivers are utilities an operating system uses to communicate with specific hardware components. Many device drivers are distributed along with operating systems, while others are distributed with the hardware components they drive. With respect to display monitors and printers, the associated device drivers control the actual display or printing, respectively, of the graphics specified by the application, such as by controlling memory updates of buffers that reflect what is being exhibited on a monitor or printed.

As shown in FIG. 1, conventional application 21 communicates with graphics module 14 of operating system 27 using one or more graphics objects in logical driver object form. For example, application 21 could instruct graphics module 14 to draw a line on a graphics component such as a monitor or printer using a certain graphics object, such as a red pen. Such a communication typically would be in the form of a logical driver object. The contents, i.e., the data within the logical driver object, can be created by the application or else are readily identifiable such that an application programmer knows what to create or which logical driver to use in communicating with graphics module 14 to obtain a desired result, such as the drawing of a red line in a graphics environment.

Graphics module 14, in turn, instructs device driver 16 using a physical driver object, which is a graphics object in device-dependent format. For proper graphics communications to occur, the physical driver object used must be one which corresponds to the content of the logical driver object used by application 21. Typically, physical driver objects are created by device driver 16. In "MICROSOFT" "WINDOWS" operating systems, the physical driver object is created when the logical driver object is selected into a device context. A device context is the environment in which graphics action occurs, such as a memory buffer, bitmap, video monitor or portion of a video monitor.

A particular physical driver object has significance to the device driver that created it. To most other software modules or hardware devices, physical driver objects are unidentifiable blocks of binary data. However, graphics module 14 has an ability to correlate the contents of the logical driver object used by a communicating application with a corresponding physical driver object used in subsequent communication with the device driver. When application 21 calls graphics module 14 with a particular logical driver object, more specifically, the contents of a particular logical driver object, the parameters of which define, for example, a red pen, graphics module 14 communicates with device driver 16 using a corresponding physical driver object, assuming device driver 16 already has created the physical driver object.

The limited ability of any mechanism except for graphics module 14 of operating system 27 to associate a physical driver object with the contents of a logical driver object presents a problem in the field of application sharing. In application sharing, an application resides in memory on a host and is shared with one or more guest computers. Each of the host and guest(s) include operating systems. The host and guest(s) also are provided with application-sharing software. The application-sharing software allows the host and guest(s) to share the application, for example over a network coupling.

In a typical application-sharing configuration, the host application-sharing software monitors entry points in device driver 16 used by graphics module 14. Whenever graphics module 14 calls device driver 16, for example to execute graphics activity, the host application-sharing software is privy to the call and knows that some graphics activity has been specified. The call from graphics module 14 to device driver 16 is based, however, on the device-dependent physical driver object. Generally, as noted above, such objects are unidentifiable blocks of binary data. Thus, host application-sharing software is limited in its ability to determine what the shared application has commanded a host graphics component to do, unless the physical driver object used by graphics module 14 can be associated with corresponding and identifiable logical driver contents, which define the parameters of the graphics object being used. Without knowing what the host graphics component has been commanded to do, the host application-sharing software will be unable to instruct the guest application-sharing software to correspondingly interact with the graphics module in the guest's operating system to identically update a guest graphics component.

Certain conventional application-sharing systems require that application sharing commence, i.e., the software that enables application sharing begin running, before or at the same time as the shared application. Because a physical driver object is not created, or "realized", until an application calls an operating system's graphics module using an associated logical driver object or, in "WINDOWS" operating systems, until an associated logical driver object is selected into a device context, it is possible to overcome limitations in conventional application-sharing systems by activating application-sharing before or concurrently with a shared application. By an application-sharing before an application has had an opportunity to create or realize physical driver objects, the generation of physical driver objects as they are created during normal shared application execution can be observed by host application-sharing software. The host application-sharing software thus readily can associate the physical driver objects as they are created with logical driver content, and can identify for application-sharing software on the guest the logical content of the physical driver objects, to inform the guest of the parameters of the graphics object being used for the graphics activity.

Other conventional methods involve a somewhat unsophisticated rummaging through private, undocumented data structures associated with a graphics module. Through empirical analysis, based on observations of activities associated with the graphics module, and through information generally known about an operating system, it is possible to relatively thoroughly establish relationships between the contents of logical driver objects and physical driver objects to an extent sufficient to enable relatively accurate application sharing. However, this method is subject to a slight degree of error, since a possibility exits that the logical content of every physical driver object might not be accurately established. Furthermore, the relationships so established are necessarily unique to particular operating systems and must be repeated to establish relationships for different operating systems and different revisions of operating systems. This obviously is inefficient with respect to time and cost.

A method is needed, therefore, for accurately and automatically identifying a correspondence between a physical driver object and the contents of one or more logical driver objects. The method should be executable at any time, even after an application has been running and some or all physical driver objects already have been created or "realized" by device drivers. The method should avoid invading and empirically studying private data structures within an operating system's graphics module.

SUMMARY OF THE INVENTION

Briefly, in accordance with an embodiment of the invention, a physical driver object is associated with its logical contents in a logical driver object. The contents of the logical driver object are identified and a non-operating system component is used to cause recreation of the physical driver object.

BRIEF DESCRIPTION OF THE DRAWINGS

The following detailed description will be more fully understood with reference to the accompanying d wings in which.

DETAILED DESCRIPTION OF PREFERRED EMBODIMENTS

Figure 1:
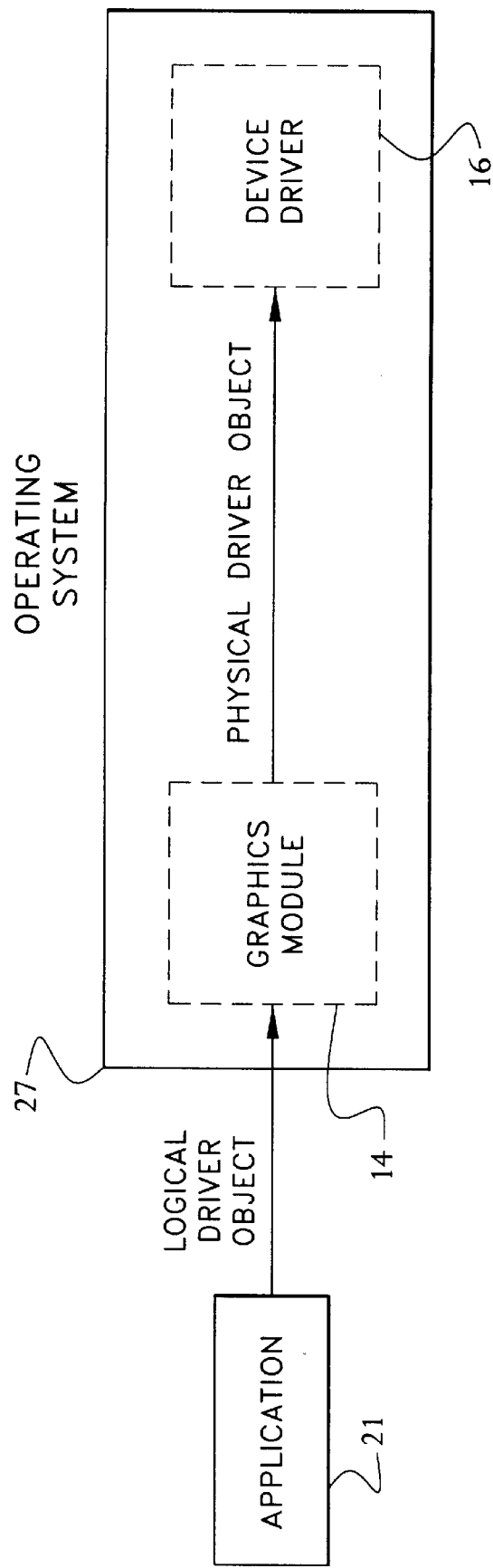
FIG. 1 is a block diagram showing graphics objects communications between an application, an operating system and a device driver.
Figure 2:
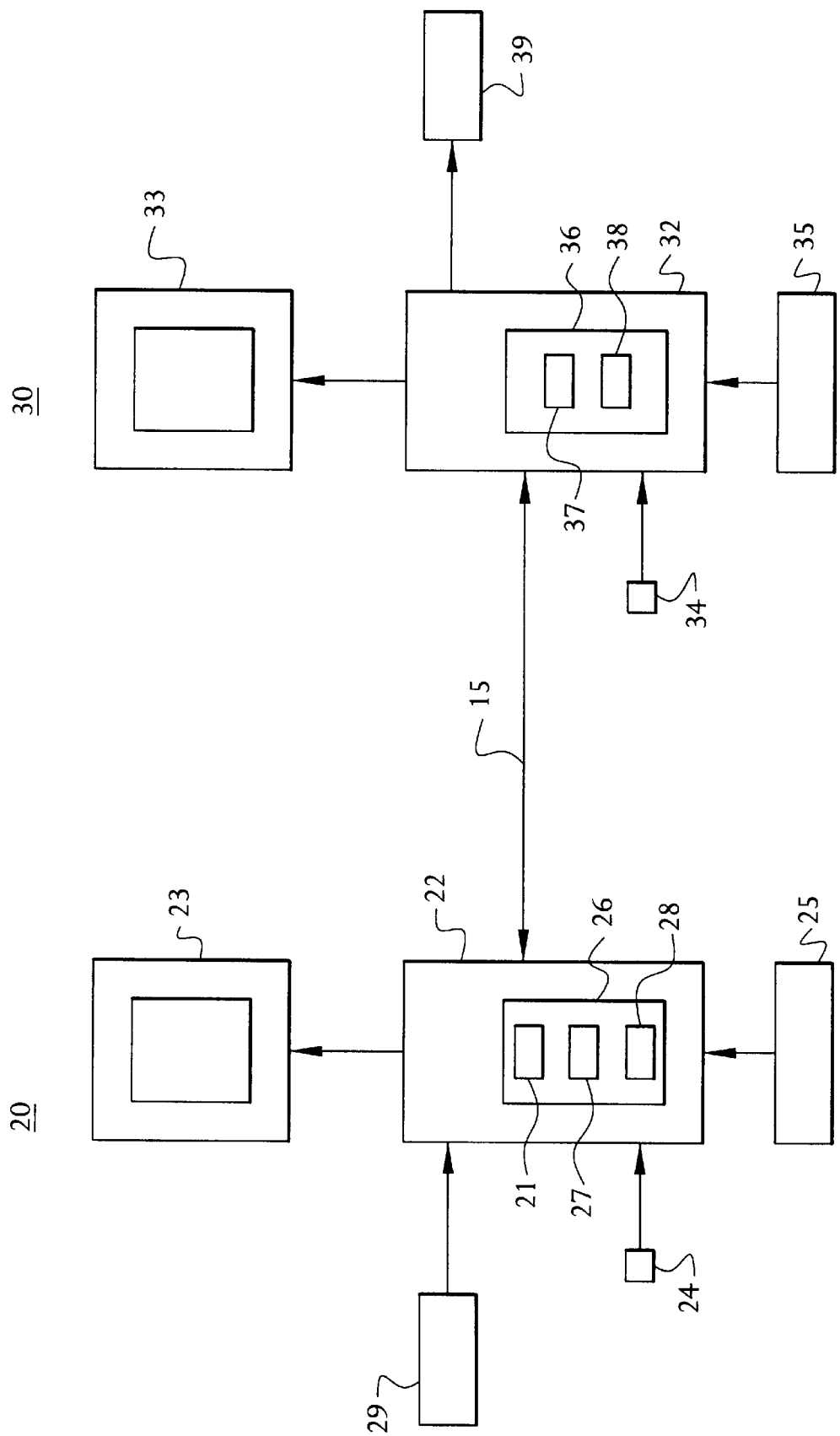
FIG. 2 is a block diagram of an embodiment of the invention employed in an application sharing configuration.

An application sharing configuration in which the invention is embodied in hostexecuted application-sharing software (HEAS) 28 is shown in FIG. 2. Application 21 resides in memory 26 on a host 20 having, for example central processing unit (CPU) 22, monitor 23, mouse 24, keyboard 25 and printer 29 and is shared with one or more guest computers, such as guest 30. Guest 30 has CPU 32, monitor 33, mouse 34, keyboard 35 and printer 39. Guest 30 also has main memory 36. Each of host 20 and guest 30 include operating systems 27 and 37, respectively. Host 20 and guest 30 also are provided with application sharing software, HEAS 28 and guest-executed application-sharing software (GEAS) 38. HEAS 28 and GEAS 38 enable host 20 and guest 30 to share application 21, for example over network coupling 15. It will be understood by one having ordinary skill that although a single guest and a single shared application are illustrated, conventional application sharing permits the sharing of multiple applications between a host and multiple guests.

Figure 3:
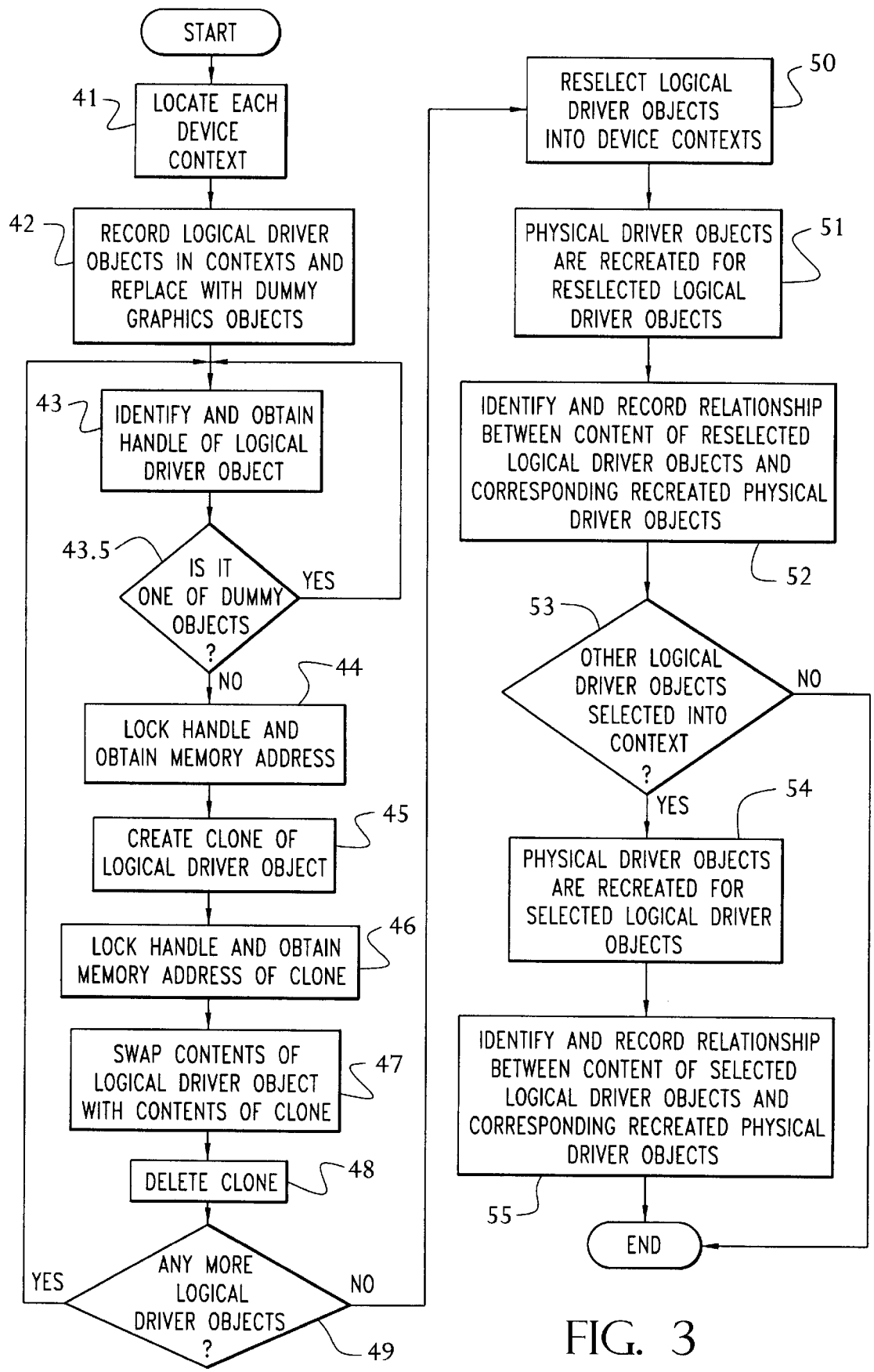
FIG. 3 is a flow chart of an embodiment of the invention.

Referring to FIG. 3, an embodiment of the invention, which accurately, automatically and efficiently allows for a determination of correspondence between physical driver objects and the contents of logical driver objects, is further explained below. It will, of course, be apparent that the scope of the invention is not limited to this particular embodiment.

Using facilities provided in typical operating systems, for example the ToolHelp library distributed with "MICROSOFT" "WINDOWS" operating systems, or by some other means apparent to those skilled in the art, the invention finds each of the device contexts (step 41 of FIG. 3). A device context, as will be understood by a person having ordinary skill in the art, is a graphics environment such as a screen display or portion of a screen display, a bitmap, etc. Each device context typically includes information associated with particular graphics objects, such as a pen and brush, currently "selected" into that device context which can be used for generating graphics in the context. Graphics objects are known to be represented in logical and physical form, depending on the environment in which they are being communicated. The information obtainable from a device context typically includes details concerning the logical driver objects currently selected into the context, from which the content of the logical driver objects can be obtained. The invention records information concerning the identity of the device contexts and the logical driver objects currently selected into the device contexts (step 42). The logical driver objects selected into the contexts are replaced with dummy graphics objects (step 42). The dummy graphics objects are objects which need not have any defined meaning or function and are not cared about as actual graphics producing objects. They are used as tools to get "real" logical driver objects out of device contexts. The dummy graphics objects are added to a database of logical driver objects which may include logical driver objects not currently selected into a device context. In "MICROSOFT" "WINDOWS" operating systems, such a database is known as a GDI local heap.

In the next step, the invention uses the ToolHelp library or some similar utility to query allocated memory associated with graphics module 14, such as the GDI local heap, for an identification of a logical driver object, such as a pen, brush, font or other such graphics object. Again using facilities provided in typical operating systems, for example the ToolHelp library distributed with "MICROSOFT" "WINDOWS" operating systems, or by some other means apparent to those skilled in the art, the handle of the logical driver object is enumerated and identified (step 43). A handle of a logical driver object typically is the representation that an application, such as application 21, uses to communicate with graphics module 14 about that particular logical driver object. After obtaining a handle for a logical driver object, a preferred embodiment requests, through normal application programming interface (API) means, such as through a <LocalLock > call in a "WINDOWS" "OPERATING" system environment, to lock the handle and obtain a pointer to the logical driver object (step 44), i.e., obtain its current memory address. The handle is locked so that the logical driver object is prevented from moving to a different memory location.

As discussed above, a physical driver object typically is created by a device driver, such as device driver 16, the first time an application communicates with graphics module 14 using a particular logical driver object or when the particular logical driver object is selected into a device context. This occurrence provides a good opportunity to recognize correspondence between the contents of the logical driver object, which define the parameters of the graphics object, and the physical driver object subsequently created. The invention, therefore, provides an accurate, repeatable and efficient way to cause device drivers, such as device driver 16, to recreate physical driver objects. The recreation can be observed to recognize a correspondence between the logical content of the logical driver object used by an application, such as application 21, and a physical driver object.

In an embodiment, the invention does this by creating a clone (step 45) of the contents of the logical driver object identified in step 43. The invention previously had identified the logical driver object and obtained its handle to identify its location in memory. The invention then duplicates the logical content, for example by making a <GetObject > call to the API in a "WINDOWS" operating system, followed by a call of <CreatePen> (for duplicating pens), or <CreateBrush>, (for duplicating brushes) etc. The clone is provided a unique identifying handle and address in memory, like the original object from which it was created. The clone, however, never has been presented to graphics module 14 or selected into a context. Graphics module 14 therefore never has obtained or caused device driver 16 to create a physical driver object corresponding to the logical contents of the clone. Therefore, no physical driver object exists which corresponds to the logical contents of the clone.

The invention locks the handle of the clone to obtain the clone's memory address (step 46). Since the memory address of the clone and the memory address of the logical driver object from which the clone was created are now known, the contents of the logical driver object can be and are swapped with the contents of the clone (step 47). The handle to the original logical driver object, which before possibly had been realized, i.e., a physical driver object had been created and associated with the contents of the logical driver object, now identifies a logical driver object which has not been realized, i.e., the contents of which have no associated physical driver object. The contents of the clone logical driver object, on the other hand, have a corresponding physical driver object.

The invention then deletes the clone (step 48). The deletion of the logical driver clone, the contents of which are associated with a physical driver object, causes operating system 27 to delete the associated physical driver object. Steps 43–48 are then repeated for each existing logical driver object with the exception of the dummy graphics objects used in step 42 until all logical driver objects have been considered (step 49). Of course, if memory space is abundant, there is no need to sequentially repeat steps 43–48 for each logical driver object. Instead, all logical driver objects can be processed at one time according to steps 43–48.

Subsequently, the contents of the logical driver objects which had been selected into device contexts are returned to or "reselected" into the device contexts, in place of the dummy logical driver objects (step 50). In an embodiment, the dummy logical driver objects are deleted. In a "MICROSOFT" "WINDOWS" operating system environment, the reselection of the contents of the logical drivers into the device contexts causes recreation or "rerealization" of physical driver objects that correspond to the contents of the logical driver objects (step 51). The recreation of the physical driver objects can be observed and recorded to recognize an association between logical driver content and physical driver objects (step 52). As the content of other logical driver objects are "selected" into device contexts (step 53), for example when switching pen color or object type, i.e., pen to brush, the graphics module causes rerealization of physical driver objects for the content of those logical driver objects (step 54). The invention identifies and records the association of and correspondence between the rerealized physical driver object and the content of the logical driver object (step 55).

In another embodiment, the physical driver objects are not rerealized when the contents of a logical driver object are selected into a device context, but when the application actually requests that graphics be generated in the particular contexts, such as when application 21 requires a display update or a print. For example, as the application requests graphics activity in the contexts, the physical driver objects for the logical driver object selected into those contexts are rerealized. Moreover, as different graphics objects, i.e., different logical driver content, are selected into various contexts, physical driver objects are rerealized when those objects are actually used for graphics activity in the context. The relationship between the logical driver contents used in the context and the physical driver object consequently created can be identified and recorded in accordance with the invention.

In either embodiment, a separate table in memory can be established for recording an identification of the correspondence between logical driver content and physical driver objects. In another embodiment, the memory space holding a recreated physical driver object can be made larger than the object itself. The extra space preferably is used to store data identifying the correspondence of the physical driver object to the contents of a logical driver object.

The invention is particularly useful in application sharing environments, such as the environment illustrated in FIG. 2. When a participant, such as one of host 20 or guest 30, causes shared application 21 to modify an image on display monitor 23 of host 20 or print an image using printer 29, the guest display monitor 33 must be correspondingly updated or an identical image printed by the guest printer 39. In order to update guest monitor 33 or cause guest 30 to print an identical image on guest printer 39, GEAS 38 must communicate with the graphics module of operating system 37 of guest 30 using a logical driver object with similar content as used by shared application 21 on host 20. The invention, embodied in HEAS 28, provides a way for HEAS 28 to associate the content of the logical driver objects used by shared application 21 with a physical driver object which may already have been created by forcing recreation of the physical driver object and observing the recreation. When graphics activity involving shared application 21 occurs on the host, GEAS 38 is made aware of the particular content of the logical driver object used during host graphics activity, enabling GEAS 38 to communicate with a GDI of guest operating system 37 using appropriate logical driver objects, such that guest display monitor 33 can be accurately updated or guest printer 39 accurately controlled to print an image.

Since many of the steps carried out by the invention preferably occur upon initialization of HEAS 28, regardless of whether an application to be shared already is running, and regardless of whether some or all physical driver objects already have been created or realized, the invention allows application sharing software to be activated after the application being shared without any adverse affects on the accuracy of graphics objects communicated to the guest. Application sharing also can be accurately ported to different operating systems and will be less affected by revisions to current operating systems, since graphics objects communications no longer are dependent on a programmers knowledge of a unique graphics module associated with a particular operating system or operating system revision.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

It should be understood that various changes in the details, materials, and arrangements of the parts which have been described and illustrated in order to explain the nature of this invention may be made by those skilled in the art without departing from the principle and scope of the invention as expressed in the following claims. It should also be understood that the term "graphics" as used herein includes text.

What I claim is:

1. A computer-implemented method for associating a physical driver object with a contents of a logical driver object, comprising the steps of:
   (a) identifying the contents of the logical driver object; and
   (b) using a non-operating system component to change the contents of the logical driver object, to delete an association with the physical driver object while a device driver that receives the physical driver object is still coupled to the system;
   (c) using the non-operating system component to cause recreation of the physical driver object after step (b); and
   (d) recording a relationship formed in step (c) between the contents of the logical driver object and the recreated physical driver object.

2. The method of claim 1, wherein step (a) comprises the steps of:
   (1) locating a device context into which the contents of the logical driver object has been selected;
   (2) recording the contents; and
   (3) replacing the contents with a contents of a dummy graphics logical driver object.

3. The method of claim 2, wherein step (c) comprises:
   (1) creating a clone of the logical driver object;
   (2) obtaining a memory address of the logical driver object and the clone;
   (3) swapping the contents of the logical driver object with a contents of the clone;
   (4) deleting the clone; and
   (5) selecting the logical driver object into a device context, wherein:
       the operating system recreates the physical driver object, further comprising the step of:
       (c) recording a relationship between the contents of the logical driver object and the recreated physical driver object.

4. A computer-implemented method for associating a physical driver object with a contents of a logical driver object, comprising the steps of:
   (a) identifying the contents of the logical driver object; and
   (b) using a non-operating system component to cause recreation of the physical driver object, including the steps of:
       (1) creating a clone of the logical driver object;
       (2) obtaining a memory address of the logical driver object and the clone;
       (3) swapping the contents of the logical driver object with the contents of the clone; and
       (4) deleting the clone.

5. The method of claim 4, wherein step (b) further comprises the step of:
   (5) selecting the logical driver object into a device context, wherein:
       the operating system recreates the physical driver object.

6. The method of claim 4, wherein step (b) further comprises the step of:
   (5) selecting the logical driver object into a device context;
   (6) requesting use of the logical driver object in the device context, wherein:
       the operating system recreates the physical driver object.

7. The method of claim 4, wherein there are a plurality of logical driver objects and steps (b)(1)–(b)(4) are repeated for each of the plurality of the logical driver objects.

8. A computer-implemented method for associating a physical driver object with a contents of a logical driver object, comprising the steps of:
   (a) identifying the contents of the logical driver object, including the steps of:
       (1) locating a device context into which the contents of the logical driver object has been selected;
       (2) recording the contents; and
       (3) replacing, the contents with a contents of a dummy graphics logical driver object; and
   (b) using a non-operating system component to cause recreation of the physical driver object,
   wherein there are a plurality of device contexts into each of which a contents of one of a plurality of logical driver objects has been selected, wherein steps (a)(1)–(a)(3) are repeated for each device context.

9. An apparatus for associating a physical driver object with a contents of a logical driver object, comprising:
   (a) means for identifying the contents of the logical driver object; and
   (b) a non-operating system component which changes the contents of the logical driver object, to delete an association with the physical driver object while a device driver that receives the physical driver object is still coupled to the system;
   (c) means for using a non-operating system component to cause recreation of the physical driver object, including:
   (d) means for recording a relationship between the contents of the logical driver object and the recreated physical driver object.

10. The apparatus of claim 9, wherein means (a) comprises:
    (1) means for locating a device context into which the contents of the logical driver object has been selected;
    (2) means for recording the contents; and
    (3) means for replacing the contents with a contents of a dummy graphics logical driver object.

11. The apparatus of claim 10, wherein the non-operating system component comprises:
(1) means for creating a clone of the logical driver object;
(2) means for obtaining a memory address of the logical driver object and the clone;
(3) means for swapping the contents of the logical driver object with a contents of the clone;
(4) means for deleting the clone; and
(5) means for selecting the logical driver object into a device context, wherein:
the operating system recreates the physical driver object.

12. An apparatus for associating a physical driver object with a contents of a logical driver object, comprising:
(a) means for identifying the contents of the logical driver object; and
(b) a non-operating system component which causes recreation of the physical driver object, including:
(1) means for creating a clone of the logical driver object;
(2) means for obtaining an address of the logical driver object and the clone;
(3) means for swapping the contents of the logical driver object with a contents of the clone; and
(4) means for deleting the clone.

13. The apparatus of claim 12, where the non-operating system component further comprises:
(5) means for selecting the logical driver object into a device context, wherein:
the operating system recreates the physical driver object.

14. The apparatus of claim 12, wherein the non-operating system component further comprises:
(5) means for selecting the logical driver object into a device context;
(6) means for requesting use of the logical object in the device context, wherein:
the operating system recreates the physical driver object.

15. A storage medium encoded with a machine-readable computer program code for associating a physical driver object with a contents of a logical driver object, comprising:
(a) means for causing a computer to identify the contents of the logical driver object;
(b) non-operating system means for changing the contents of the logical driver object, to delete an association with the physical driver object while a device driver that receives the physical driver object is still coupled to the system;
(c) non-operating system means for causing recreation of the physical driver object; and
(d) means for causing the computer to record a relationship between the contents of the logical driver object and the recreated physical driver object.

16. The storage medium of claim 15, wherein means (a) comprises:
(1) means for causing the computer to locate a device context into which the contents of the logical driver object has been selected;
(2) means for causing the computer to record the contents; and
(3) means for causing the computer to replace the contents with the contents of a dummy graphics logical driver object.

17. The storage medium of claim 16, wherein there are a plurality of device contexts into which a contents of one of a plurality of logical driver objects has been selected, wherein:
means (a)(1) causes the computer to locate each of the plurality of device contexts;
means (a)(2) causes the computer to record the contents selected into each of the plurality of device contexts; and
means (a)(3) causes the computer to replace the contents selected into each of the plurality of device contexts with a contents of one or more respective dummy graphics logical driver objects.

18. The storage medium of claim 16, wherein means (c) comprises:
(1) means for causing the computer to create a clone of the logical driver object;
(2) means for causing the computer to obtain a memory address of the logical driver object and the clone;
(3) means for causing the computer to swap the contents of the logical driver object with a contents of the clone;
(4) means for causing the computer to delete the clone; and
(5) means for causing the computer to select the logical driver object into a device context,
wherein:
the operating system recreates the physical driver object, further comprising:
(c) means for causing the computer to record a relationship between the contents of the logical driver object and the recreated physical driver object.

19. A storage medium encoded with a machine-readable computer program code for associating a physical driver object with a contents of a logical driver object, comprising:
(a) means for causing a computer to identify the contents of the logical driver object; and
(b) non-operating system means for causing recreation of the physical driver object, including:
(1) means for causing the computer to create a clone of the logical driver object;
(2) means for causing the computer to obtain a memory address of the logical driver object and the clone;
(3) means for causing the computer to swap the contents of the logical driver object with a contents of the clone; and
(4) means for causing the computer to delete the clone.

20. The storage medium of claim 19, wherein means (b) further comprises:
(5) means for causing the computer to select the logical driver object into a device context, wherein:
the operating system recreates the physical driver object.

21. The storage medium of claim 19, wherein means (b) further comprises:
(5) means for causing the computer to select the logical driver object into a device context; wherein:
an application requests use of the logical driver object in the device context and the operating system recreates the physical driver object.

22. The storage medium of claim 19, wherein the computer has a plurality of logical driver objects; and:
means (b)(1) causes the computer to create a clone of each of the plurality of logical driver objects;
means (b)(2) causes the computer to obtain a memory address of each of the logical driver objects with a contents of a respective one of a plurality of clones; and means (b)(3) causes the computer to swap the contents of each of the logical driver objects with a contents of a respective one of plurality of clones; and means (b)(4) causes the computer to delete the clones.

23. An application sharing system, comprising:

a host computer, which includes an operating system and a shared application, wherein the host computer includes:

means for associating a physical driver object with a contents of a logical driver object and communicating the contents of the logical driver object to a guest computer, including:

(a) means for identifying the contents of the logical driver object;

(b) a non-operating system component which changes the contents of the logical driver object, to delete an association with the physical driver object while a device driver that receives the physical driver object is still coupled to the system;

(c) means for causing recreation of the physical driver object; and (d) records a relationship between the contents of the logical driver object and the recreated physical driver object.

24. The system of claim 23, wherein the host computer identifies the contents of the logical driver object by:

(1) locating a device context into which the contents of the logical driver object has been selected;

(2) recording the contents; and (3) replacing the contents with a contents of a dummy graphics logical driver object.

25. The system of claim 24, wherein the host computer causes recreation of the physical driver object by:

(1) creating a clone of the logical driver object;

(2) obtaining a memory address of the logical driver object and the clone;

(3) swapping the contents of the logical driver object with a contents of the clone;

(4) deleting the clone; and (5) selecting the logical driver object into a device context, wherein:

the operating system recreates the physical driver object, wherein the computer further:

(c) records a relationship between the contents of the logical driver object and the recreated physical driver object.

26. An application sharing system, comprising:

a host computer, which includes an operating system and a shared application, wherein the host computer includes means for associating a physical driver object with a contents of a logical driver object and communicating the contents of the logical driver object to a guest computer, including:

(a) means for identifying the contents of the logical driver object;

(b) means for causing recreation of the physical driver object;

wherein the host computer causes recreation of the physical driver object by:

(1) creating a clone of the logical driver object;

(2) obtaining a memory address of the logical driver object and the clone;

(3) swapping the contents of the logical driver object with a contents of the clone; and (4) deleting the clone.

27. The system of claim 26, wherein the host computer further:

(5) selects the logical driver object into a device context, wherein:

the operating system recreates the physical driver object.

28. The system of claim 26, wherein the host computer further:

(5) selects the logical driver object into a device context, wherein:

the operating system recreates the physical driver object when the logical driver object is used in the device context.

* * * * *